United States Patent
Frederiksen, Jr. et al.

(10) Patent No.: US 7,561,809 B2
(45) Date of Patent: Jul. 14, 2009

(54) MODULATED LASER WITH INTEGRAL PRE-DISTORTION CIRCUIT

(75) Inventors: Thomas R. Frederiksen, Jr., Hatboro, PA (US); Stephen B. Krasulick, Fogelsville, PA (US)

(73) Assignee: Finisar Corporation, Horsham, PA (US)

( * ) Notice: Subject to any disclaimer, the term of this patent is extended or adjusted under 35 U.S.C. 154(b) by 560 days.

(21) Appl. No.: 10/710,881

(22) Filed: Aug. 10, 2004

(65) Prior Publication Data

US 2005/0036792 A1    Feb. 17, 2005

Related U.S. Application Data

(60) Provisional application No. 60/481,207, filed on Aug. 11, 2003.

(51) Int. Cl.
*H04B 10/04* (2006.01)

(52) U.S. Cl. .................. 398/193; 398/182; 398/194; 398/195; 398/196; 398/197; 398/198; 330/149; 327/317; 327/318; 327/306; 375/296

(58) Field of Classification Search .......... 398/193, 398/194, 159, 195, 182, 183, 186, 192, 196, 398/197, 198; 330/149; 327/317, 306, 318; 375/296
See application file for complete search history.

(56) References Cited

U.S. PATENT DOCUMENTS

| 5,282,072 | A | * | 1/1994 | Nazarathy et al. | 398/193 |
|---|---|---|---|---|---|
| 6,204,718 | B1 | * | 3/2001 | Pidgeon, Jr. | 327/318 |
| 6,226,424 | B1 | | 5/2001 | Ball et al. | |
| 6,917,764 | B1 | * | 7/2005 | Wilson | 398/193 |
| 6,985,020 | B2 | * | 1/2006 | Zhou | 327/317 |
| 2004/0052536 | A1 | * | 3/2004 | Zhou | 398/193 |

* cited by examiner

*Primary Examiner*—Hanh Phan
(74) *Attorney, Agent, or Firm*—Kurt Rauschenbach; Rauschenbach Patent Law Group, LLC

(57) ABSTRACT

An integrated laser device includes a pre-distortion circuit. The pre-distortion circuit receives an electrical modulation signal and generates a pre-distorted modulation signal. A laser is integral with the pre-distortion circuit. The laser includes an electrical modulation input that is connected to the output of the pre-distortion circuit. The laser modulates an optical signal with the pre-distorted modulation signal. The pre-distorted modulation signal causes at least some vector cancellation of distortion signals generated when the laser modulates the optical signal.

28 Claims, 4 Drawing Sheets

US 7,561,809 B2

MODULATED LASER WITH INTEGRAL PRE-DISTORTION CIRCUIT

CROSS REFERENCE TO RELATED APPLICATIONS

This patent application claims priority to U.S. Provisional Patent Application Ser. No. 60/481,207, filed on Aug. 11, 2003, the entire disclosure of which is incorporated herein by reference.

BACKGROUND OF INVENTION

Directly modulated lasers and electro-absorption (EA) modulated lasers are often used to transmit data in analog transmission systems, such as cable television transmission systems. These analog transmission systems typically use a pre-distortion circuit to compensate for distortions that occur as a result of modulating the laser. Known pre-distortion circuits are physically located external to the laser package.

BRIEF DESCRIPTION OF DRAWINGS

This invention is described with particularity in the detailed description and the claims sections. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
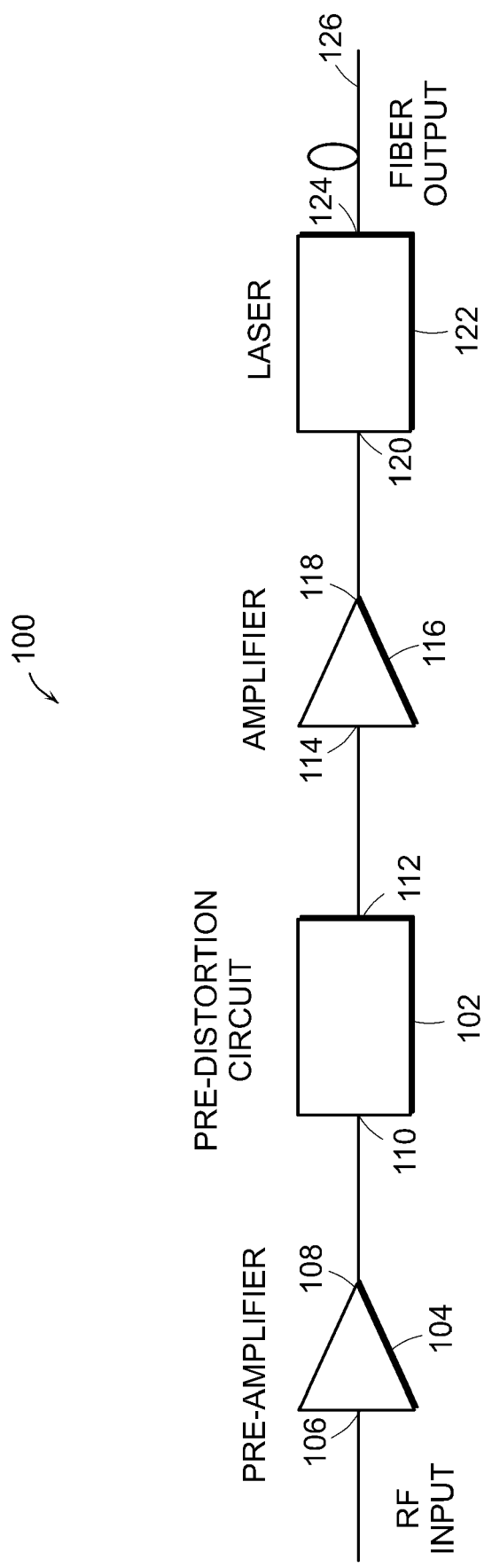
FIG. 1 illustrates a simplified block diagram of a known directly modulated optical transmitter that uses an external pre-distortion circuit.

Optical transmitters used for many analog applications, such as CATV transmission, are required to have extremely good linearity in order to keep distortion signals to an acceptable level. The most significant distortion signals caused by non-linearities are Composite Second Order (CSO) distortion signals, Discrete Second Order (DSO) intermodulation distortion signals, Composite Triple Beat (CTB) distortion signals and Discrete Third Order (DTO) intermodulation distortion signals.

Discrete Second Order intermodulation signals are defined herein to mean signals that are produced when one or two carriers pass through a non-linear component. In other words, the discrete second order signals are the result of the non-linear processing of signals which generates a new signal at one or more frequencies given by the forms $2f_1, f_1+f_2, f_1-f_2$.

Discrete Third Order (DTO) intermodulation signals are defined herein as signals that are produced when two or three carriers pass through a non-linear element. In other words, the DTO product is the result of the non-linear mixing of signals which generates a new signal at one or more frequencies given by the forms: $3f_1, f_1 \pm f_2 \pm f_3, 2f_1 \pm f_2, 2f_2 \pm f_1$.

Composite Second Order distortion is a well known distortion effect in CATV transmission systems that can be introduced by both the optical transmitter and by the optical fiber link. Composite Second Order distortion is defined herein to mean any combination or superposition of distortion signals resulting from nonlinear mixing of two signals having different frequencies (i.e. $f_a \pm f_b$) within the frequency band of interest. Composite Second Order distortion includes all discrete second-order products that are at the same nominal frequency in a multi-tone system. Quantitatively, CSO is defined as the difference (in dB) between the RMS voltage of the carrier at its peak and the RMS voltage of superposition. Composite second order distortion generally increases with an increasing optical intensity modulation index of the optical modulator.

Composite Triple Beat distortion signals, which are also called composite third-order distortion signals, are defined herein to mean a superposition or composite of third-order distortion signals resulting from the nonlinear mixing of two or three different frequencies (i.e. $mf_a \pm nf_b$, where m and n are integers having a sum equal to three or $f_a \pm f_b \pm f_c$) within the frequency band of interest.

Composite Triple Beat distortion is caused when three fundamental signals combine or when second harmonic signals combine with a fundamental signal. Composite Triple Beat distortion can appear as low-frequency interference on video signals. Composite Triple Beat distortion generally increases as the number of channels increases. Many second order and third order distortion products are present in narrow frequency bands or essentially at a single frequency because of typical frequency assignments used in commercial communication systems. Quantitatively, CTB is defined as the difference (in dB) between the RMS voltage of the carrier measured at its peak and the RMS voltage of this superposition.

Directly modulated lasers, EA modulated lasers, and externally modulated lasers often produce CSO and CTB distortion signals and DSO and DTO intermodulation distortion signals that can prevent the transmitter from achieving the required linearity for many analog applications, such as CATV transmission applications. Typical specifications for CSO and CTB for CATV applications are in the range of −67 dB and −70 dB respectively over a 1 Mhz channel bandwidth. To achieve these specifications, more than 10 dB of correction can be required. Pre-distortion techniques are typically used to improve linearity in many analog applications.

These pre-distortion techniques compensate for non-linearities introduced by the modulation process. One type of pre-distortion technique creates pre-distortion signals that are complimentary to the distortions that are generated by the modulation process. The pre-distortion signals are then superimposed onto the modulation drive signal to compensate for distortion signals generated by the modulation process. A properly designed pre-distortion circuit can significantly counteract the distortion generated by the modulation process.

FIG. 1 illustrates a simplified block diagram of a known directly modulated optical transmitter 100 that uses an external pre-distortion circuit 102. The transmitter 100 includes a RF pre-amplifier 104 having an input 106 that receives a modulation signal from a modulation source (not shown). The pre-amplifier 104 generates an amplified modulation signal at an output 108 having a signal level that is suitable for the pre-distortion circuit 102.

The output 108 of the pre-amplifier 104 is electrically connected to an input 110 of the pre-distortion circuit 102.

The pre-distortion circuit 102 generates a pre-distortion signal that compensates for the distortion that is produced during the modulation process. One type of pre-distortion circuit produces distortion products that are the compliment of the distortion products produced in the modulation process. When the signal containing these complimentary distortion products is applied to the modulator there is a vector cancellation of the distortion products produced by the modulator. The pre-distortion circuit 102 generates a signal at an output 112 that includes a superposition of the pre-distortion signal and the modulation signal.

The output 112 of the pre-distortion circuit 102 is electrically connected to an input 114 of an amplifier 116. The amplifier 116 generates a laser modulation signal at an output 118 that includes the superposition of the modulation signal and the pre-distortion signal amplified to the appropriate signal level for direct modulation. The output 118 of the amplifier 116 is electrically connected to a modulation input 120 of a directly modulated laser 122. The laser 122 generates a modulated optical signal at an output 124. An optical fiber 126 is coupled to the output 124 of the laser 122.

A properly designed transmitter with a pre-distortion circuit 102 can significantly reduce the level of distortion in the modulated optical signal generated by the laser 122. In order to achieve acceptable linearity for many analog applications, the amplitude and phase response of the pre-distortion signal as a function of frequency must be preserved to a very high degree as the signal propagates down the signal path to the modulation input 120 of the directly modulated laser 122.

Thus, the amplifier 116, and any additional circuitry following the pre-distortion circuit 102, should have a very flat amplitude and phase response as a function of frequency over the bandwidth of the modulation signal. The flat amplitude and phase response is necessary to maintain the amplitude and phase of the pre-distortion signals superimposed on the modulation signal so that the vector cancellation of the distortions caused by the modulation process is achieved.

Many analog transmission systems, such as CATV transmission systems, occupy more than a decade of bandwidth. Consequently, equalization circuits are sometimes used to achieve the required level of flatness in amplitude and phase response that is necessary to achieve the required level of linearity of the transmitter. These equalization circuits add cost, complexity, and calibration time to the transmitter.

The present invention relates to integrating a pre-distortion circuit with a modulated laser, such as a directly modulated laser, EA modulated laser, or externally modulated laser. Integrating the pre-distortion circuit with the modulated laser can eliminate the need for an amplifier between the pre-distortion circuit and the modulated laser and, therefore, can eliminate the need for an equalization circuits and other interface components, such as impedance matching components, drivers, and biasing networks.

In addition, integrating the pre-distortion circuit with the modulated laser can improve impedance matching between the pre-distortion circuit and the modulated laser and, therefore, can reduce the size, complexity, and cost of the transmitter. Impedance matching networks can be a source of amplitude and phase aberrations that can degrade the performance of the pre-distortion circuit. Integrating the pre-distortion circuit into the laser package allows the designer to match the output impedance of the pre-distortion circuit to the input impedance of the laser, thus eliminating the need for a matching circuit and improving the performance of the pre-distortion circuit. Also, integrating the pre-distortion circuit with the laser allows those skilled in the design of CATV circuits but not skilled in electrooptics to build high-performance laser transmitters.

Figure 2:
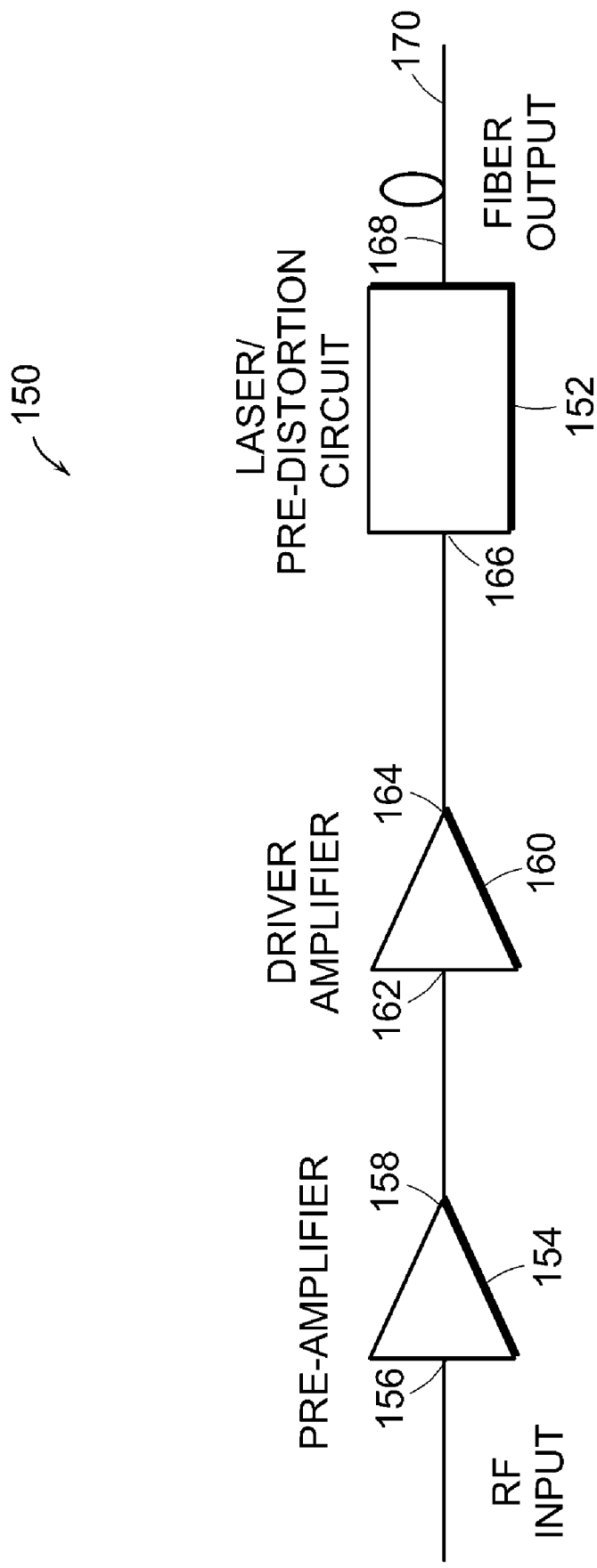
FIG. 2 illustrates a simplified block diagram of a directly modulated optical transmitter that includes an integrated pre-distortion circuit and directly modulated laser according to the present invention.

FIG. 2 illustrates a simplified block diagram of an optical transmitter 150 that includes an integrated pre-distortion circuit and directly modulated laser 152 according to the present invention. The optical transmitter 150 also includes a RF pre-amplifier 154 having an input 156 that receives a modulation signal from a modulation source (not shown). The pre-amplifier 154 generates an amplified modulation signal at an output 158 having a signal level that is suitable for amplification by a driver amplifier 160.

The output 158 of the pre-amplifier 154 is connected to an input 162 of the laser driver amplifier 160. The laser driver amplifier 160 generates an amplified modulation signal at an output 164 having a signal level that is suitable for modulation. The output 164 of the laser driver amplifier 160 is connected to a modulation input 166 of the integrated pre-distortion circuit and the directly modulated laser 152.

The pre-distortion circuit in the integrated pre-distortion circuit and directly modulated laser 152 generates a pre-distortion signal that compensates for the distortion that is produced during modulation and combines the pre-distortion signal with the amplified modulation signal to generate a pre-distorted modulation signal. The integrated pre-distortion circuit and directly modulated laser 152 modulates the pre-distorted modulation signal and generates a modulated optical signal at an output 168. An optical fiber 170 is coupled to the output 168. The pre-distortion signal causes a vector cancellation of the distortion signals produced when modulating the amplified modulation signal with the integrated directly modulated laser.

The integrated pre-distortion circuit and directly modulated laser 152 eliminates the equalization circuits and components, such as impedance matching circuits, drivers, and biasing networks between the pre-distortion circuit and the modulation input of the directly modulated laser that are used in known transmitters including directly modulated lasers. Therefore, integrating the pre-distortion circuit with the directly modulated laser 152 reduces or eliminates the possibility of introducing amplitude and phase distortion in the signal path between the pre-distortion circuit and the modulation input of the directly modulated laser. Reducing or eliminating amplitude and phase distortion in the signal path between the pre-distortion circuit and the modulation input of the directly modulated laser can result in a greater degree of distortion cancellation, which can result in better transmitter performance.

Figure 3:
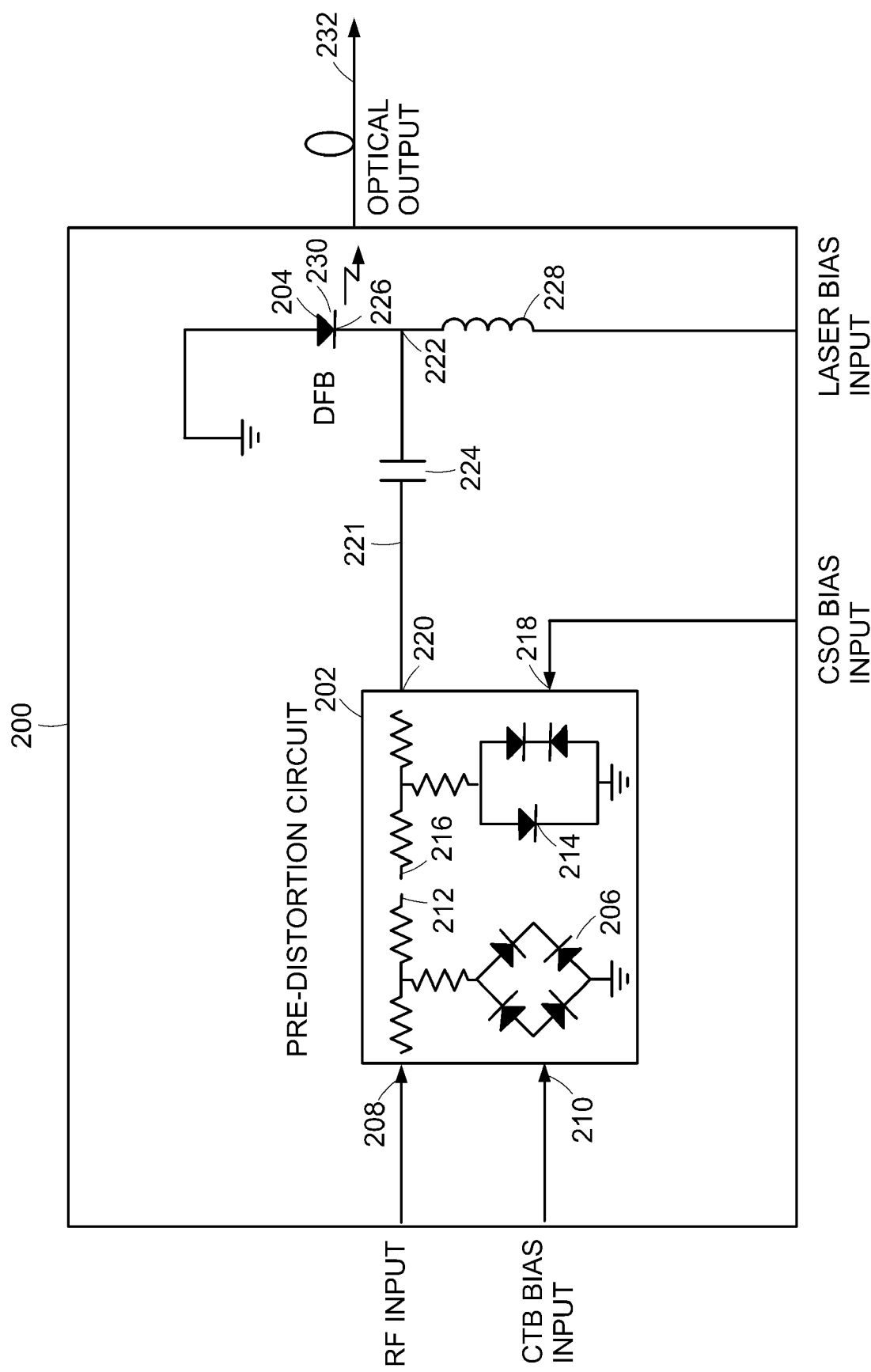
FIG. 3 illustrates a simplified block diagram of an integrated pre-distortion circuit and directly modulated laser according to the present invention.

FIG. 3 illustrates a simplified block diagram of an integrated pre-distortion circuit and directly modulated laser 200 according to the present invention. The integrated pre-distortion circuit and directly modulated laser 200 includes an integrated pre-distortion circuit 202 and a semiconductor directly modulated laser 204. The pre-distortion circuit 202 can be one of numerous types of pre-distortion circuits that are known in the art. The semiconductor laser 204 can be one of numerous types of semiconductor lasers, such as a distributed feedback (DFB) laser.

The integrated pre-distortion circuit 202 shown in FIG. 3 includes a first shunt-type pre-distortion circuit 206 that uses non-linearities inherent in semiconductor diodes to create third-order pre-distortion signals that are used to cancel the third-order distortion signals generated by the modulation process. The first shunt-type pre-distortion circuit 206 includes a RF input 208 that receives the desired RF modulation signal that is generated by a modulation source (not shown). The first shunt-type pre-distortion circuit 206 also includes a CTB bias input 210 that receives a DC bias signal from a DC power supply (not shown) that bias the diodes in the first shunt-type pre-distortion circuit 206 to the appropriate bias point for generating the desired third-order distortion signal.

The first shunt-type pre-distortion circuit 206 generates a CTB pre-distortion signal that is sufficient to cancel third-order distortion signals generated by the modulation process. The first shunt-type pre-distortion circuit 206 then superimposes the CTB pre-distortion signal onto the RF modulation signal and generates a RF modulation signal including the CTB pre-distortion signals at an output 212.

The integrated pre-distortion circuit 202 also includes a second shunt-type pre-distortion circuit 214 that uses non-linearities inherent in semiconductor diodes to create second-order pre-distortion signals that are used to cancel the second-order distortion signals generated by the modulation process. The second shunt-type pre-distortion circuit 214 includes an input 216 that receives the RF modulation signal including the CTB pre-distortion signal that was generated by the first shunt-type pre-distortion circuit 206. The amplitude and phase response as a function of frequency of the CTB pre-distortion signal superimposed onto the RF modulation signal is maintained because the physical distance between the output 212 of the first shunt-type pre-distortion circuit 206 and the input 216 of the second shunt-type pre-distortion circuit 214 is very short.

The second shunt-type pre-distortion circuit 214 also includes a CSO bias input 218 that receives a DC bias signal from a DC power supply (not shown) that bias the diodes in the second shunt-type pre-distortion circuit 214 to the appropriate bias point for generating the desired second-order distortion signal. The second shunt-type pre-distortion circuit 214 generates a CSO pre-distortion signal that is sufficient to cancel second-order distortion signals generated by the modulation process.

The second shunt-type pre-distortion circuit 214 then superimposes the CSO pre-distortion signal onto the RF modulation signal including the CTB pre-distortion signal that was generated by the first shunt-type pre-distortion circuit 206 at an output 220. The resulting pre-distorted modulation signal includes the RF modulation signal and the CSO and the CTB pre-distortion signals that are sufficient to cancel both the second- and the third-order distortion signals that are generated in the modulation process. Numerous other pre-distortion circuit topologies are possible. For example, another pre-distortion circuit according to the present invention includes a single pre-distortion circuit with two bias inputs that creates both the second- and the third-order pre-distortion signals.

The output 220 of the pre-distortion circuit 202 is coupled to a modulation input 222 of the laser 204 by a transmission line 221. A capacitor 224 can be inserted into the transmission line 221 to block any DC components in the pre-distorted modulation signal. In one embodiment, the characteristic impedance of the transmission line 221 is chosen so that the amplitude and the phase response of the pre-distorted modulation signal as a function of frequency is maintained along the transmission line 221.

In one embodiment of the invention, the characteristic impedance of the transmission line 221 is chosen to substantially match at least one of the output impedance of the pre-distortion circuit 202 and the input impedance of the modulation input 222 of the laser 204. Known pre-distortion circuits are designed to work with transmission lines that have standard or commonly available characteristic impedance. Integrating the pre-distortion circuit 202 and the directly modulated laser 204 into a single package as shown in FIG. 3 allows the designer to use the optimal characteristic impedance without regard to limitations imposed by commonly available transmission lines.

The laser 204 also includes a bias input 226 this is connected to a DC power supply (not shown) that generates a current that biases the laser 204 at the appropriate operating point. An inductor 228 can be connected in series with the bias input 226 and used to block AC modulation signals from the pre-distortion circuit 202. The laser 204 generates a linearized modulated optical signal at an out-put 230. The output 230 can be connected to an optical fiber 232 that transmits data through an optical fiber communication system.

The amplitude and phase response of the pre-distorted modulation signal as a function of frequency can be substantially maintained after the pre-distorted modulation signal is generated and before it is received by the modulation input 222 of the laser 204. The amplitude and phase response of the pre-distorted modulation signal can be substantially maintained because the physical distance between the output 220 of the pre-distortion circuit 202 and the modulation input 222 of the laser 204 is very short. In addition, the amplitude and phase response of the pre-distorted modulation signal can be maintained because of the lack of impedance matching and amplification circuitry between the output 220 of the pre-distortion circuit 202 and the modulation input 222 of the laser 204.

The pre-distortion circuit 202 and directly modulated laser 204 can be fabricated monolithically. For example, the pre-distortion circuit 202 and directly modulated laser 204 can be fabricated on a single die that is used for an optical component in the laser package. Alternatively, the pre-distortion circuit 202 and directly modulated laser 204 can be fabricated on separate dies and then integrated into one package. The separate dies can be relatively small and inexpensive and can use different fabrication processes and materials.

Integrating the pre-distortion circuit 202 and the directly modulated laser 204 on one die or two separate dies in close proximity in the same package reduces temperature variations between the pre-distortion circuit 202 and the directly modulated laser 204. Temperature dependent non-linearities can be experienced by both the pre-distortion circuit 202 and the directly modulated laser 204. A properly designed integrated pre-distortion circuit 202 can generate a pre-distortion signal that cancels any temperature dependent non-linearities that are generated during modulation. In embodiments where the directly modulated laser 204 includes a temperature controller, the pre-distortion circuit 202 can be mounted on the same temperature controlling element as the laser 204.

Figure 4:
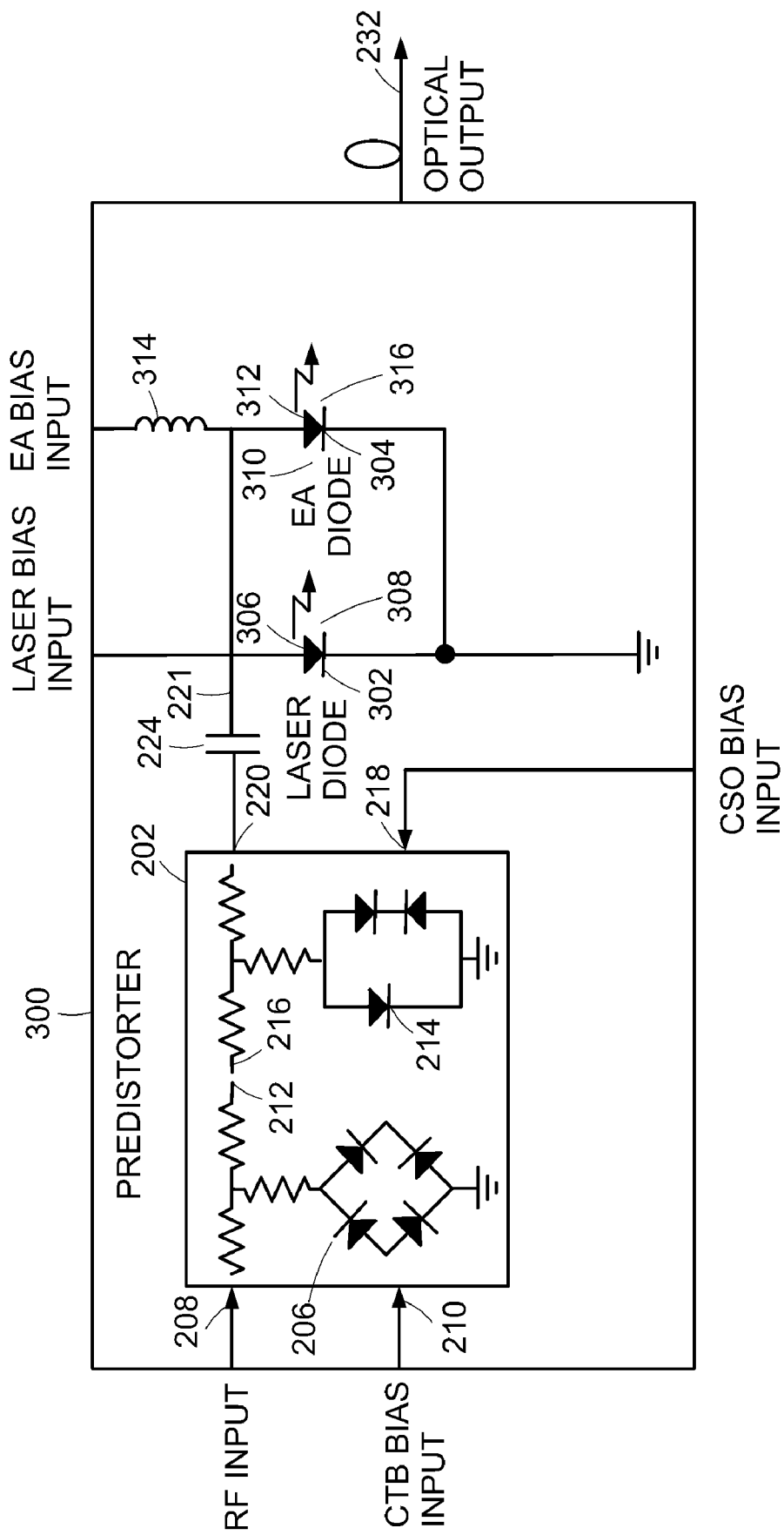
FIG. 4 illustrates a simplified block diagram of an integrated pre-distortion circuit and EA modulated laser according to the present invention.

The integrated pre-distortion circuit according to the present invention can be used with numerous types of modulated lasers. For example, the integrated pre-distortion circuit can be used with an EA modulated laser or with an integrated Electro-Absorption Modulated Laser (EML). FIG. 4 illustrates a simplified block diagram of an integrated pre-distortion circuit and EA modulated laser 300 according to the present invention.

The integrated pre-distortion circuit and EA modulated laser 300 is similar to the integrated pre-distortion circuit and directly modulated laser 200 described in connection with FIG. 3. However, the integrated pre-distortion circuit and EA modulated laser 300 includes a CW laser 302 followed by an EA modulator 304. A bias input 306 of the CW laser 302 is connected to a DC power supply (not shown). The DC power supply generates a current that biases the CW laser 302. The CW laser 302 generates a CW optical signal at an output 308.

The EA modulator 304 has an optical input 310 that is positioned in optical communication with the output 308 of the CW laser 302. The EA modulator 304 also has a bias and modulation input 312 that is electrically connected to a DC power supply (not shown) that generates a voltage that biases the EA modulator 304 at the appropriate operating point. An inductor 314 can be used to block AC modulation signals from the pre-distortion circuit 202.

The bias and modulation input 312 is also electrically connected to an output 220 of the pre distortion circuit 202. A capacitor 224 can be inserted into the transmission line 221 to block any DC components in the pre-distorted modulation signal. In one embodiment, the characteristic impedance of the transmission line 221 is chosen so that the amplitude and phase response of the pre-distorted modulation signal as a function of frequency is maintained along the transmission line 221.

The EA modulator 304 generates a linearized modulated optical signal at an output 316. The output 316 can be coupled to an optical fiber 232 that transmits data through an optical fiber communication system. In one embodiment, the amplitude and phase response of the pre-distorted modulation signal as a function of frequency is maintained after the pre-distorted modulation signal is generated and before it is received by the bias and modulation input 312 of the EA modulator 304.

The amplitude and phase response of the pre-distorted modulation signal can be maintained because the physical distance between the output 220 of the pre-distortion circuit 202 and the bias and modulation input 312 of the EA modulator 304 is very short. In addition, the amplitude and phase response of the pre-distorted modulation signal can be maintained because of the lack of impedance matching and amplification circuitry between the output 220 of the pre-distortion circuit 202 and the bias and modulation input 312 of the EA modulator 304.

The pre-distortion circuit 202, CW laser 302, and EA modulator 304 can be fabricated monolithically. For example, the pre-distortion circuit 202, CW laser 302, and EA modulator 304 can be fabricated on a single die that is used for an optical component in the laser package. Alternatively, the pre-distortion circuit 202, CW laser 302, and EA modulator 304 can be fabricated on two or three separate dies and then integrated into one package. The separate dies can be relatively small and inexpensive and can use different fabrication processes and materials.

Integrating the pre-distortion circuit 202, CW laser 302, and EA modulator 304 on one, two, or three separate dies in close proximity in the same package reduces temperature variations between the components. A properly designed integrated pre-distortion circuit 202 can generate a pre-distortion signal that cancels any temperature dependent non-linearities. In the case of a cooled CW laser, the pre-distortion circuit 202 can be mounted on the same temperature controlling element as the CW laser 302.

While the invention has been particularly shown and described with reference to specific embodiments, it should be understood by those skilled in the art that various changes in form and detail may be made therein without departing from the spirit and scope of the invention as defined herein.

The invention claimed is:

1. An integrated laser device comprising:
   a) pre-distortion circuit fabricated on a monolithic substrate having an input that receives an electrical modulation signal, the pre-distortion circuit generating a pre-distorted modulation signal at an output from the electrical modulation signal; and
   b) a laser fabricated on the monolithic substrate in close proximity to the pre-distortion circuit, the laser having an electrical modulation input that is connected to the output of the pre-distortion circuit so that an input impedance of the electrical modulation input of the laser is substantially matched to an output impedance of the pre-distortion circuit, the laser modulating an optical signal with the pre-distorted modulation signal, wherein the pre-distorted modulation signal causes at least some vector cancellation of distortion signal generated when the laser modulates the optical signal.

2. The integrated laser device of claim 1 wherein the pre-distortion circuit comprises a shunt-type pre-distortion circuit.

3. The integrated laser device of claim 2 wherein the shunt-type pre-distortion circuit comprises a non-linear electronic device.

4. The integrated laser device of claim 2 wherein the shunt-type pre-distortion circuit comprises a semiconductor diode.

5. The integrated laser device of claim 1 wherein the pre-distortion circuit comprises a first and a second shunt-type pre-distortion circuit.

6. The integrated laser device of claim 1 wherein the pre-distortion circuit generates a pre-distortion signals that reduce third-order distortion signals that are generated when the laser modulates the optical signal.

7. The integrated laser device of claim 1 wherein the pre-distortion circuit generates pre-distortion signals that reduce second-order distortion signals that are generated when the laser modulates the optical signal.

8. The integrated laser device of claim 1 wherein the pre-distortion circuit generates a pre-distortion signals that reduce temperature dependent distortion signals that are generated when the laser modulates the optical signal.

9. The integrated laser device of claim 1 wherein the pre-distortion circuit generates a pre-distortion signals that reduce temperature dependent distortion signals that are generated by the pre-distortion circuit.

10. The integrated laser device of claim 1 wherein the pre-distortion circuit comprises a bias input that receives a bias signal that controls the vector cancellation of the distortion signals generated when the laser modulates the optical signal.

11. The integrated laser device of claim 1 wherein the laser comprises a distributed feedback laser.

12. The integrated laser device of claim 1 wherein the laser comprises an electro-absorption modulated laser.

13. The integrated laser device of claim 1 wherein an output impedance of an amplifier that amplifies the electrical modulation signal is substantially matched to an input impedance of the pre-distortion circuit.

14. The integrated laser device of claim 1 wherein the pre-distortion circuit generates the pre-distorted modulation signal by generating a pre-distortion signal and combining the pre-distortion signal with the electrical modulation signal.

15. The integrated laser device of claim 1 wherein the pre-distorted modulation signal causes vector cancellation of substantially all distortion signals generated when the laser modulates the optical signal.

16. The integrated laser device of claim 1 further comprising an integral transmission line that couples the output of the pre-distortion circuit to the electrical modulation input of the laser, the integral transmission line substantially maintaining an amplitude and a phase response of the pre-distorted modulation signal.

17. An optical source having reduced second-order and third-order distortions, the optical source comprising:

a) pre-distortion circuit fabricated on a monolithic substrate having a input that receives an electrical modulation signal, a first bias input that receives a first bias signal, and a second bias input that receives a second bias signal, the pre-distortion circuit generating a pre-distorted modulation signal at an output from the electrical modulation signal, the first bias signal, and the second bias signal; and b) a laser fabricated on the monolithic substrate in close proximity to the pre-distortion circuit, the laser having an electrical modulation input that is connected to the output of the pre-distortion circuit so that an input impedance of the electrical modulation input of the laser is substantially matched to an output impedance of the pre-distortion circuit, the laser modulating an optical signal with the pre-distorted modulation signal, wherein the pre-distorted modulation signal causes at least some vector cancellation of second-order distortion signals generated when the laser modulates the optical signal in response to the first bias signal and causes at least some vector cancellation of third-order distortion signals generated when the laser modulates the optical signal in response to the second bias signal.

18. The optical source of claim 17 wherein the pre-distortion circuit comprises a first shunt-type pre-distortion circuit having an input that receives the first bias signal and a second shunt-type pre-distortion circuit having an input that receives the second bias signal.

19. The optical source of claim 17 wherein the laser comprises a distributed feedback laser.

20. The optical source of claim 17 wherein the laser comprises an electro-absorption modulated laser.

21. The optical source of claim 17 wherein the pre-distorted modulation signal causes vector cancellation of substantially all of the first-order and second-order distortion signals generated when the laser modulates the optical signal.

22. The optical source of claim 17 further comprising an integral transmission line that couples the output of the pre-distortion circuit to the electrical modulation input of the laser, the integral transmission line substantially maintaining an amplitude and a phase response of the pre-distorted modulation signal.

23. A method of generating a modulated optical signal with reduced second-order and third-order distortions, the method comprising:

a) generating a first bias signal that is related to second-order distortions generated during modulation;

b) generating a second bias signal that is related to third-order distortions generated during modulation;

c) processing an electrical modulation signal with a non-linear electronic circuit that is biased by both the first bias signal and the second bias signal, the non-linear circuit generating a pre-distorted modulation signal;

d) propagating the pre-distorted modulation signal through a transmission line to a modulation input of a laser monolithically fabricated with the non-linear electronic circuit and having an input impedance that is substantially matched to an output impedance of the non-linear circuit, the transmission line substantially maintaining an amplitude and a phase response of the pre-distorted modulation signal; and e) modulating the laser with the pre-distorted modulation signal to generate a modulated optical signal, wherein the pre-distorted modulation signal causes at least some vector cancellation of both the second-order and the third order distortion signals generated during modulation.

24. The method of claim 23 wherein at least one of the first and the second bias signals is related to temperature dependent distortion signals that are generated when the laser is modulated.

25. The method of claim 23 wherein the modulating the laser comprises directly modulating the laser.

26. The method of claim 23 wherein the modulating the laser comprises electro-optically modulating the laser.

27. The method of claim 23 wherein the pre-distorted modulation signal causes vector cancellation of substantially all of the second-order and the third-order distortion signals generated when the laser is modulated.

28. An optical source comprising:

a) means for generating a first bias signal that is related to second-order distortions generated during modulation;

b) means for generating a second bias signal that is related to third-order distortions generated during modulation;

c) means for non-linearly processing an electrical modulation signal with a non-linear circuit in response to both the first bias signal and the second bias signal to generate a pre-distorted modulation signal;

d) means for propagating the pre-distorted modulation signal through a transmission line to a modulation input of a laser monolithically fabricated with the non-linear electronic circuit and having an input impedance that is substantially matched to an output impedance of the non-linear circuit, wherein an amplitude and a phase response of the pre-distorted modulation signal are substantially maintained along the transmission line; and e) means for modulating a laser with the pre-distorted modulation signal to generate a modulated optical signal, wherein the pre-distorted modulation signal causes at least some vector cancellation of both the second-order and the third order distortion signals generated during modulation.

* * * * *

UNITED STATES PATENT AND TRADEMARK OFFICE
CERTIFICATE OF CORRECTION

PATENT NO. : 7,561,809 B2
APPLICATION NO. : 10/710881
DATED : July 14, 2009
INVENTOR(S) : Frederiksen et al.

It is certified that error appears in the above-identified patent and that said Letters Patent is hereby corrected as shown below:

Claim 1, Column 8, line 10 should read as follows:

"...distortion signals..."

Claim 17, Column 9, line 2 should read as follows:

"...having an input..."

Signed and Sealed this

Twenty-second Day of September, 2009

David J. Kappos
*Director of the United States Patent and Trademark Office*